VOLTAGE APPLIED TO INTEGRATOR WHEN FILM IS AT REST

SCANNING WAVE FORM WHEN FILM IS AT REST

VOLTAGES ACTING IN SERIES ON INTEGRATOR WHEN FILM MOVES

RESULTANT VOLTAGE APPLIED TO INTEGRATOR WHEN FILM MOVES

RESULTANT SCANNING WAVE

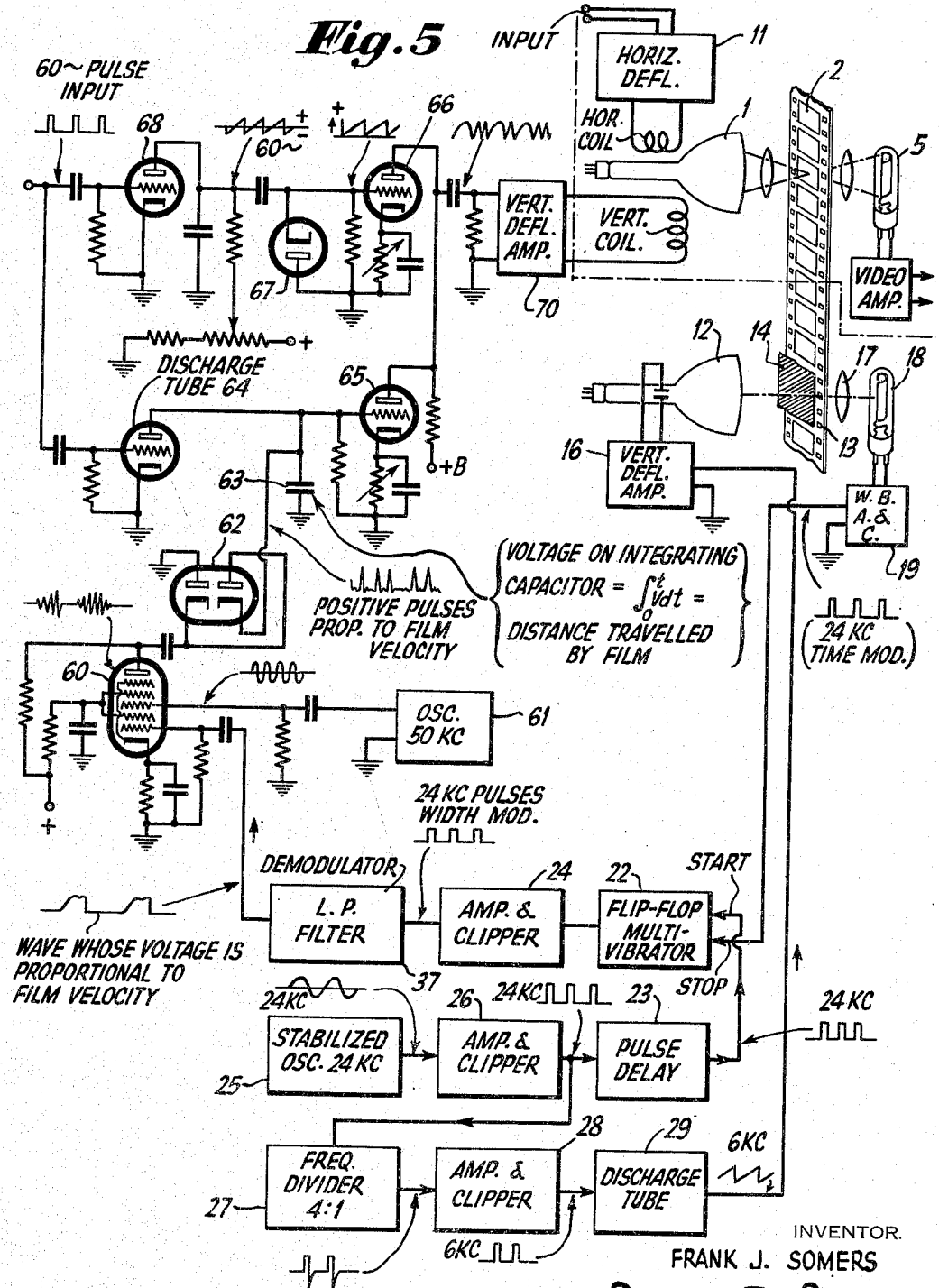

Patented Sept. 19, 1950

2,523,156

UNITED STATES PATENT OFFICE 2,523,156

VERTICAL SWEEP VOLTAGE CORRECTION FOR FILM MOVEMENT IN FLYING SPOT SCANSION

Frank J. Somers, Rockville Centre, N. Y., assignor to Radio Corporation of America, a corporation of Delaware Application June 12, 1947, Serial No. 754,250

17 Claims. (Cl. 178—7.2)

In the art of scanning pictures or images for television purposes where such pictures or images have been furnished by a motion picture projector, there have, in general, been used in the prior art to which this invention belongs, two methods or systems of developing signals which are representative of the images recorded on the picture film. In both of these methods or systems, the scene to be transmitted has been projected upon a photoemissive area or mosaic of a television camera tube of the electronic variety (such as those known as the Iconoscope, the Orthicon, or the like) and the resulting electrical image is methodically explored by electronic means, one narrow line or strip at a time, in the scanning process.

In the first of these systems and methods, the film has been masked from the photoemissive mosaic except at selected intervals, during which time light has been directed through the film to project a recorded frame of the film onto the mosaic and the scansion of the mosaic has been accomplished during the time intervals when the film is masked from the mosaic of the camera tube. This can be done due to the fact that the scansion tube used has been of the so-called "storage" type of tube, such, for instance, as the "Iconoscope." In the storage type of tube, signals are developed by scanning the photoemissive mosaic with an electron beam, line by line, and neutralizing, or otherwise removing the effect of the produced charges, which have resulted on the mosaic from the emission of electrons therefrom under the impetus of light which has been directed onto it to produce signal output trains to represent the scanned subject. An intermittent type of projector may be used with the storage type of scansion tube and film pull down is accomplished at a time when the film is masked from the photoemissive mosaic and scansion of the mosaic by the scanning beam also is accomplished during a time when the film is masked with respect to the mosaic.

In the second of these systems and methods, a non-storage type of scansion tube has been employed and only the light falling upon an element of the photoemissive area at the instant that area is being scanned is effective in producing a signal. In this system, for every instant that the signal is transmitted, the film projector must supply a light image to at least a part of the photoemissive area, although not necessarily from the entire frame of the picture. It has been attempted heretofore to solve the problem of changing the frames of the film producing the optical image to be televised by the use of a so-called continuous projector, that is to say, a type of projector in which the film is never masked from the photosensitive mosaic. Registration of the frames of the optical image being televised is attempted by the use of a complex optical system usually known as an "optical rectifier." The film itself is moved continuously and hence lacks the type of intermittent motion of the film that takes place in the so-called intermittent projector which may be used with the first system described. The continuous projector, however, has possessed serious disadvantages. In the first place, the projector uses a complex and expensive optical system which does not always prove satisfactory in operation. In the second place, the light losses occurring when a continuous projector is used in a television system are great and constitute a serious problem.

The present invention relates to a television scanning apparatus or system which is related generally to the second system using a non-storage type of photoelectric response apparatus. It is a major object of my invention, therefore, to provide such a system in which an intermittent type of projection may be used in contradistinction to the continuous type of projection usually used with a non-storage type of photoelectric element and thus avoid the disadvantages of using a continuous projector.

Interest has been shown by various television engineers in the use of the so-called "flying spot" type of scanning. In one embodiment of this type of scanning, a spot of light of high intensity is developed by the impingement of a cathode ray beam on a luminescing target. Movement of the spot is accomplished by deflecting the beam. This produced spot of light is focussed upon and directed through the film which is furnishing the image to be televised and is modulated in intensity by its passage through the image recorded on the film by the varying degrees of opacity and transparency of the film which results from the optical image recorded thereon. The light so modulated impinges onto a phototube and the output signals of the phototube are a measure of the modulation of the light by the incremental areas of the optical image recorded on the film. These signals, when reproduced, give a representation of the image recorded on the motion picture film. Systems of film scanning by a moving light spot are shown illustratively in U. S. Patent, Re. #19,314, dated September 11, 1934, granted to V. K. Zworykin and U. S. Patent No. 2,291,723, dated August 4, 1942, granted to Jensen.

Where the so-called flying spot type of scanning is used, there is normally not sufficient time to scan an entire field of the image in the normal fashion with a non-storage type of photoelectric device. Since if time were taken to scan a complete field of the image, then the pull-down time of the film would be so short that the film would be subjected to prohibitively high stresses. Accordingly, it is an additional object of my invention to provide a scanning system and apparatus for scanning motion picture film and in which this disadvantage will be eliminated.

Arrangements of the prior art have attempted to eliminate the effects of putting too much stress on the material around the sprocket holes of a film due to the extremely short pull-down time for the film by allowing the film motion itself to contribute to the scansion. Scansion takes place not only while the film is at rest but also while the film is in motion. Where this is done, the movement of the cathode ray beam producing the scanning light spot does not take place in a linear manner but there must be some compensation made for the speed of the film.

One way of compensating is by measuring the speed with which the sprocket holes pass a predetermined point and to develop a compensating wave dependent upon this speed. This is done by having a light spot pass through the sprocket holes of the film and, for best results, the material around the sprocket holes should be opaque. It is a further purpose of this invention to provide an arrangement of this general nature which will allow the use of standard film and will allow the use of film where the material in the region of the sprocket holes of the film may be variable in opacity.

Other objects and advantages will become apparent to those skilled in the art from a reading of the hereinafter appended specification.

My invention, in general, contemplates the provision of a first cathode ray tube which produces a cathode ray beam which is directed so as to impinge onto a luminescing target in the tube and thus provide a spot of light of considerable brilliance. The light spot so formed is projected through the moving picture film on which an image to be televised is recorded and the light thus, in effect, may be modulated by the light and shadow variations of the film. The so modulated light is directed onto the cathode of a photoelectric element for developing signals representative of the optical values of incremental sections of the recorded image on the film. Deflection of the cathode ray beam which produces the light spot causes a movement of the spot in a regular scanning sequence and thus the beam traces a complete raster on the cathode ray tube target and the spot of light will follow the raster traced by the beam. Thus a complete film field or film frame may be scanned by directing the spot of light so moved through the film and onto the photoelectric element.

Additionally, there is provided a second cathode ray tube with the cathode ray beam developed therein being deflected by deflecting apparatus energized by a sawtooth waveform in such a way that the light spot produced on the target by this beam covers a limited area of the film in the neighborhood of the sprocket holes. The light from the second flying spot is adapted to pass through at least one of the sprocket holes in the course of its deflection and, in so doing, then to develop a signal pulse in the output of a phototube due to its being so directed as to impinge upon the cathode element of the phototube. The result, then, is that the output of the second phototube will constitute a signal which is substantially fixed in amplitude but which is time modulated in accordance with the speed of motion of the film. The series of pulses so produced will be unequally spaced in time during the periods when the film speed is varying. When the film is stationary, the pulses will be of equal duration and will be equally spaced apart.

The pulses so produced are used to develop a compensating waveform which effectively is combined with the normal sawtooth waveform developed to deflect the beam producing the actual scanning spot and the result is that the scanning spot will be deflected in a manner which bears a definite relationship to the speed with which the film is being moved.

In general, the pulses produced by the action of the second cathode ray tube are changed from a set of pulses of equal width which are time modulated into a set of pulses which are width modulated or duration modulated. This is accomplished by allowing the pulses developed by the phototube due to the action of the second cathode ray tube to furnish one of the control pulses of a "flip-flop" or multi-stroke type multivibrator and the other control pulse is a constant frequency pulse developed by a local oscillator. The width modulated pulses so produced are passed through a low pass filter and the compensating waveform is developed under the control of the output of the filter. Since the pulses from the second phototube are time spaced in accordance with the speed of the film, and since the width modulated pulses are developed from these pulses which bear a relationship to the film speed, the compensating waveform which is developed also will bear a relationship to the film speed.

Since the pull-down of the film is not of constant speed and, further, since the scanning speed must, in some fashion, be related to the speed of the pull-down of the film if uniform scansion is to be accomplished during the pull-down period, this arrangement will allow the film to control the actual scanning of itself in accordance with its own speed.

The invention will be understood best by reference to the drawings in which:

Fig. 5 is an alternative form of my invention.

Figure 1:
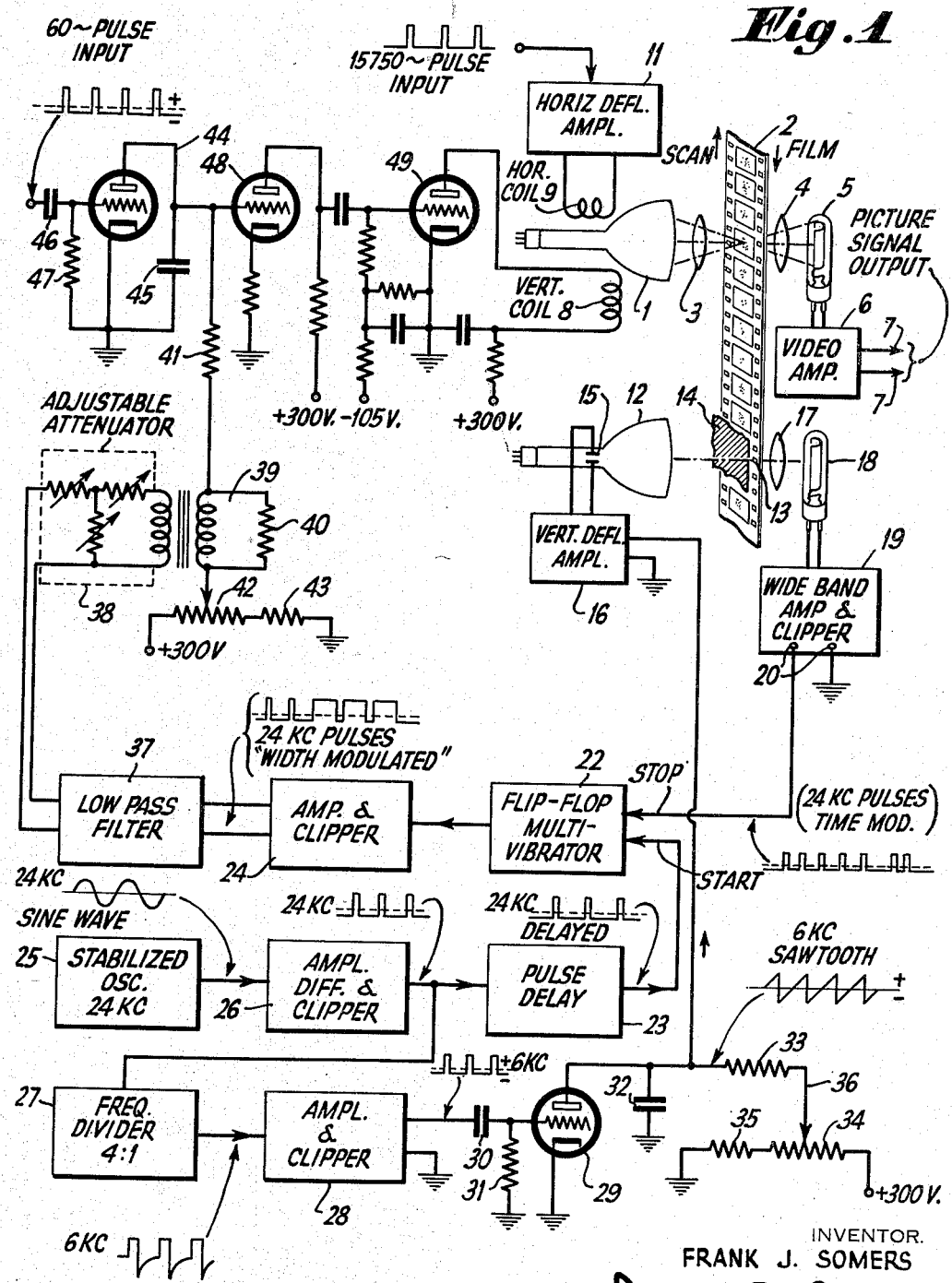
Fig. 1 is one embodiment of the invention.

Referring to Fig. 1, there is shown a preferred embodiment of my invention, a cathode ray tube which performs the function of a light source in a "flying spot" type of scanning apparatus. Light developed by the impingement of the cathode ray beam of the tube onto a luminescing target is moved by the deflection of the beam in the tube itself. The light so formed is focussed onto film 2 by a lens member 3 and the light transmitted through the film is picked up by a lens member 4 which directs it onto the cathode of a photoelectric tube 5. The latter may incorporate an electron multiplier unit if desired. The output signal developed by photoelectric element 5 will comprise a video signal and the latter is fed to an amplifier 6 which is a conventional type of video amplifier used in television pick-ups. The output from terminals 7, 7 of amplifier 6 may be used to modulate the carrier of a television broadcast transmitter or to feed a television relay system or may be directly reproduced.

When film 1 is stationary, the vertical deflection system and the horizontal deflection system, each of which is represented by a single coil identified by the reference numerals 8 and 9 respectively, are provided with the normal 60 cycle energizing currents and the 15,750 cycle scanning currents corresponding to the field scansion frequency and line scansion frequency respectively. The light spot formed and so moved passes through the film where it is intensity modulated by the varying degrees of shade of the image recorded on the film, and the entire scanning process may be considered to be entirely conventional. It is, however, necessary to provide a modified waveform to the vertical deflection coil when the film moves if scansion is to be accomplished while the film is moving, since the motion of the film itself then contributes at least partly to the vertical component of scansion.

An auxiliary or second cathode ray tube 12 is provided to produce a light spot to scan the sprocket holes 13 at one edge of the film in the same manner that tube 1 is used to scan the image part of the film. Movement of the light spot, however, is accomplished in only one co-ordinate in the auxiliary tube. The tube 12 normally will be located to scan the film sprocket holes a few frames ahead or behind the picture scanning resulting in a simple mechanical arrangement of parts. This spacing apart of the tubes in location will not affect the accuracy or the system as long as there is no slack in the film between the two scanned areas.

An opaque mask 14 is interposed between the tube 12 and the film so that light from the scanning spot will not impinge on the recorded image on the film. The movement of the spot being vertical only, only one pair of deflection plates 15 is provided and these plates will be energized in a manner which will be explained hereinafter in this specification. Light from the scanning spot passing through the film and the sprocket holes will be picked up by a lens 17 and directed onto the photosensitive element of a photoelectric tube 18 which may have an electron multiplier furnished in conjunction therewith. The output of tube 18 may be passed through a wide band amplifier and clipper 19 from the output terminals 20 thereof to flop a multi-stroke or flip-flop type of multivibrator 22 which has been flipped or started by a pulse from a pulse delay network 23. The output of the multivibrator 22 is passed to an amplifier and clipper circuit 24 and the output thereof will consist of a set of width modulated pulses which will be utilized as explained hereinbefore.

The pulse delay network 23 whose output controls multivibrator 22 has impressed on the input thereof pulses developed by a stabilized oscillator 25 whose output is assumed as 24 kc. by way of example. These pulses are then passed through a differentiating and clipping amplifier 26.

Another portion of the output from amplifier 26 is passed to a frequency divider 27 whose output is one-quarter that of the input frequency thereto. Since the input is a 24 kc. tone, the output thereof will be a 6 kc. tone which is passed through amplifier and clipper 28 to control a conventional type of sawtooth oscillator 29 whose output will be a sawtooth wave of 6 kc. frequency. Since the space to be scanned by the scanning spot developed by tube 12 is approximately the length of four sprocket holes of film, it will be obvious that, since the scanning speed is very high compared to the speed of movement of the film, the output signal from tube 18 will comprise a 24 kc. set of pulses.

The sawtooth oscillator including the tube 29 is arranged so that 6 kc. pulses may be impressed on the grid thereof through condenser 30 and leak resistor 31. Between pulses the condenser 32 will charge in a substantially linear fashion through a source of potential and resistors 33, 34, and 35. Since this is a conventional arrangement, no extended explanation thereof is necessary and its operation will be obvious.

The width modulated pulses from amplifier and clipper 24 are impressed onto a low pass filter 37 and thence to an attenuating network 38 comprising the primary of a transformer connected with series and shunt resistances. The secondary 39 of the transformer is shunted by resistor 40 and is connected at one terminal thereof to a resistor 41 and the other terminal thereof to the sliding arm of a potentiometer 42. The potentiometer comprising resistor 43 is grounded at one terminal and the other terminal thereof is energized by a source of voltage indicated as +300 v. by way of example.

A vacuum tube 44 is provided and has the plate thereof energized by the source of potential indicated as +300 v. through resistor 41. A condenser 45 is provided which is connected in shunt to the space discharge path of the tube. The tube is controlled by 60 cycle pulses of a rectangular shape which are impressed onto the control grid thereof through condenser 46 and leak resistor 47.

The common terminal of resistor 41 and condenser 45 is connected directly to the grid of an amplifying triode 48 whose output is coupled through appropriate coupling condensers and resistors to the input of tube 49, in whose plate circuit is connected the vertical deflection coils for deflecting the beam produced in cathode ray tube 1. The operation of the circuit is as follows:

It may be assumed that the output of the vertical deflection amplifier 16 is a train of sawtooth shaped waves of 6 kc. and that the direction of scanning is opposite to the direction of film travel. It may also be assumed that proper apparatus or circuits are provided for blanking the beam in each of the cathode ray tubes during the return interval after each line or each frame. The amplitude of the 6 kc. scanning wave is adjusted so that the spot produced by cathode ray tube 12 will scan a distance equal to four sprocket holes and spaces, this being the normal space occupied by a frame of a 35 mm. film. The opaque mask 14 prevents stray light from cathode ray tube 12 from falling on the picture portion of the film. The output of phototube 18 will be a 24 kc. set of pulses which are time modulated in accordance with the speed of the film, it having been brought out that the film has a short move-down time compared to the 6 kc. scanning speed of cathode ray tube 12 and that therefore, for each of the cycles producing scanning, four sprocket holes will be intercepted. The system, in order to operate properly, will have to have a very short retrace time or fly-back time for the 6 kc. scanning frequency of cathode ray tube 12 and this should be of the order of 2.5% of a cycle or less and that its amplitude remain very nearly constant and drive the beam a distance equal to four sprocket holes and spaces (see Fig. 2a). These requirements will involve no particular practical problems since they may be solved with techniques well known in the art to which this invention belongs and wide band deflection amplifiers utilizing negative feed-back have been used previously in general and therefore no detained explanation of these problems need be given here.

Figure 2:
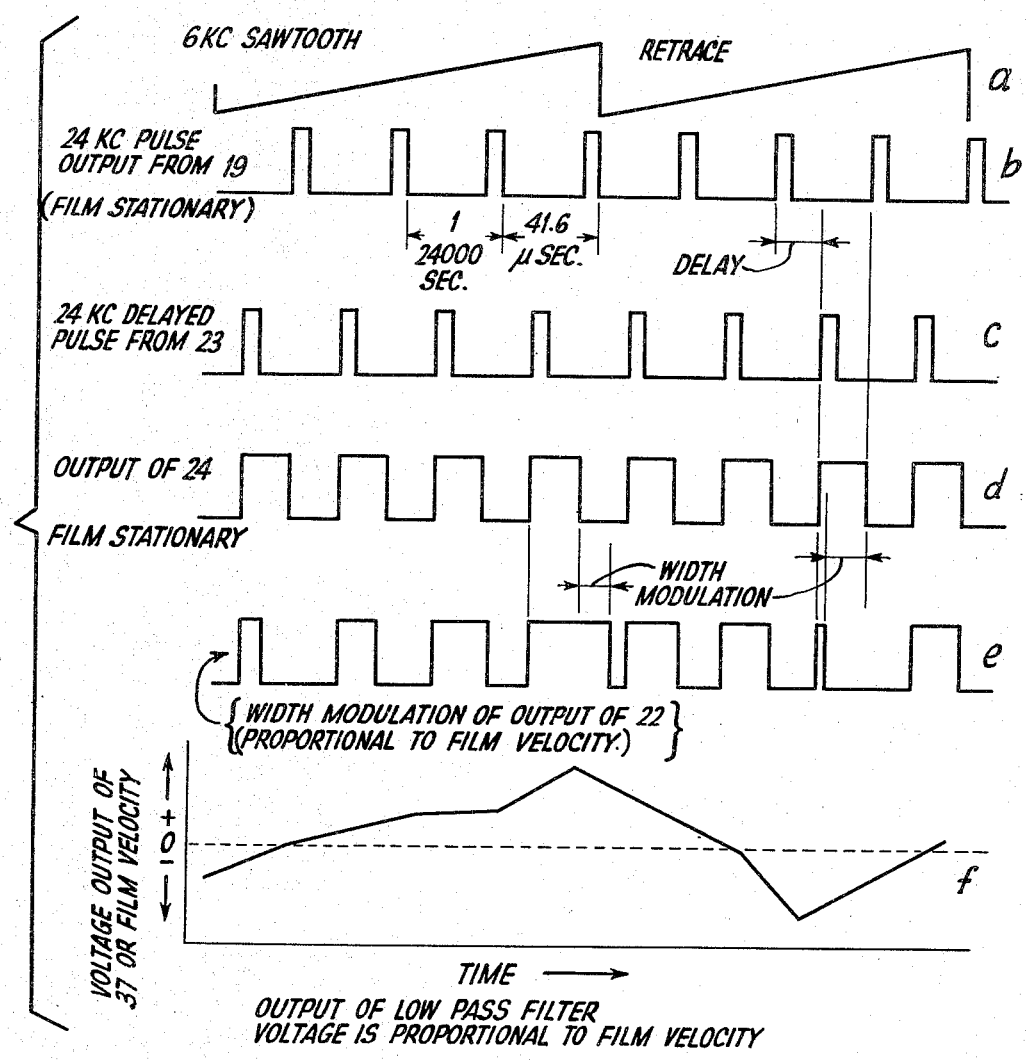
Figs. 2 through 4 are explanatory curves.

The wide band amplifier and clipper 19 should be made so that sufficient excess voltage gain may be had so that when clipping of the 24 kc. pulses takes place, the pulses will have steep sides and may be of constant amplitude regardless of varying opacity of the film surrounding the picture holes and the relative shape of these pulses is shown in Fig. 2b. Depending on the pulses involved in the making of the film which is utilized, the light transmission of the film around the sprocket holes may vary between 90% and less than 2% of the light passed through the sprocket holes and, therefore, amplifier 19 must possess a very high voltage gain in order that satisfactory clipping may be accomplished to take care of these variations in film opacity.

When the film is stationary, the output of amplifier 19 will be a set of pulses of 24 kc. which are equally spaced apart in time. It will be appreciated that since scansion takes place at a rate of 60 fields per second and the film is moved 24 frames per second, the same frame will have to be scanned more than one time and it is common practice to scan even frames twice and odd frames three times each in order to produce 60 signal fields from 24 separate frames of film. If the film moves in a direction opposite to the direction of scanning, the frequency of the signal output of phototube 18 will be increased in proportion to the film velocity since the flying spot from tube 12 will intercept more than four sprocket holes. Likewise, if the film moves in the same direction as the scanning spot, the output frequency of phototube 18 will be decreased in a manner that bears a proportionality to the film velocity. This is the same, in effect, as varying the spaces between the pulses while keeping the pulse widths constant and, accordingly, the pulses may be said to be "time modulated."

In order to derive a voltage wave corresponding to instantaneous film velocity from the output signals from phototube 18, it is necessary to use a system which is both accurate and responsive to minute changes in film velocity. This system embodies an arrangement for transforming the time modulated pulses to a train of constant frequency variable width pulses and the latter may be termed "width modulated" pulses. The latter when passed through a low pass filter, produce an output waveform whose instantaneous value corresponds or is proportional to the instantaneous film velocity. This is accomplished by passing the signals from the amplifier clipper 26 to a pulse delay circuit 23 and each of these pulses will flip the multi-stroke multivibrator 22. The shape of these pulses and the time of their occurrence relatively to the pulses developed by phototube 18 when the film is stationary is shown in Fig. 2c. The time that the multivibrator remains flipped depends upon the relative occurrence of the pulses from clipper amplifier 19 which flop the multivibrator or return it to its initial state, the multivibrator being of the well known type wherein one pulse will drive it into one phase of its operations and a second pulse will return it to its original state.

Signals developed by the multivibrator when the film is stationary are illustrated in Fig. 2d and the output when the film is moving is illustrated in Fig. 2e. The pulses are then passed through an amplifier and clipper 24 and thence through a low pass filter 37. Low pass filters themselves are well known and may be made in accordance with the principles set forth in the book entitled "Transmission Networks and Wave Filters" by Shea, 1929 edition, published by D. Van Nostrand Company, Inc. The demodulation of width modulated pulses by means of a low pass filter has been described in an article by Fredendall et al. in the "Proceedings of the IRE," volume 34, #2, pages 49–61 of the February 1946 issue. The low pass filter is given as exemplary of one manner of deriving a voltage wave which bears a relationship to the film velocity from the output of phototube 18. It will be appreciated that other arrangements could be used as, for example, a discriminator as known in the art of receiving frequency modulated signals could be used but this is less desirable than the low pass filter arrangement because of the undesirability of using tuned circuits and it is not believed that the accuracy would be as good as that with the embodiment illustrated.

The pulse delay network 23 may be of conventional design and may be in the form of an artificial line consisting of lumped series inductances and shunt capacitances terminated in its characteristic impedance. Such a line, for instance, might have a characteristic impedance of 500 ohms, a cut-off frequency of 500 kc. and a nominal time delay of 21 microseconds with an input frequency of 24 kc.

The frequency divider of unit 27 may be of the multistroke multivibrator type where two such multivibrators are connected serially and the output of each is one-half of the frequency of the input thereto. Such multivibrators are shown, for instance, in U. S. Patent 2,515,613, in the name of Earl Schoenfeld, entitled "Timer Synchronizing Signal Generator," issued July 18, 1950.

The rectangular pulse output from clipper and amplifier 28 is impressed on the input circuit of tube 29 and each pulse will cause the tube to conduct and draw grid current during the occurrence of the positive part of the pulse. At the same time, condenser 32, which has been charged substantially linearly through resistors 33 and 34 by the potential source, will be discharged through the space charge path of the tube. The grid current so drawn will bias the tube to cutoff during the intervals between the positive portions of the pulse and charging of condenser 32 will take place during these intervals. Thus, a 6 kc. sawtooth wave is produced under the control of the 6 kc. rectangular pulses impressed onto the tube.

As brought out hereinbefore, when the film is stationary, the shape of the pulses produced by phototube 18 will be that of Fig. 2d and when the film is moving, the shape will be that of Fig. 2e. An increase in width of the pulses indicates that the motion of the film is in the same direction as the direction of scanning, whereas a decrease in width indicates that the direction of the film is opposite that at which scanning takes place. Fig. 2f illustrates a typical output of the low pass filter 37 and this is a voltage wave whose excursions and amplitude are proportional to film velocity. The low pass filter 37 preferably should have a cutoff frequency of the order of 6 to 8 kc., since it has been shown by Fredendall et al. that the cutoff frequency should be one-third or less of the input pulse frequency in order to avoid distortion. A cutoff frequency of 6 kc. represents the one-hundredth harmonic of the 60 cycle vertical picture scanning rate and therefore is ample to produce an accurate compensating scanning waveform.

The output of filter 37 feeds a constant resistance attenuator 38 which preferably has an impedance equal to the surge impedance of the filter and the attenuator feeds the transformer 39 whose secondary is terminated by a resistor 40 of suitable value to cause the primary of the transformer to present the proper impedance to the filter. The function of the transformer is to isolate the filter from D. C. potentials and its connections should be chosen so as to cause no appreciable alteration of the signal waveform output of filter 37.

When the film is stationary, the output wave from filter 37 will be substantially constant, that is to say, there will be substantially no voltage transfer during this interval from the primary of the transformer 39 to the secondary thereof and hence no correction will be applied to the wave developed by tube 44.

The sliding arm of potentiometer 42 will normally be adjusted so that the 300 voltage source of potential and resistor 43 may deliver a voltage of 200 volts in series with resistor 40, resistor 41 and capacitor 45, it being assumed that tube 44 is biased to cutoff between the positive portions of the 60 cycle pulse input thereto due to the grid current which has been drawn when a positive pulse is impressed thereon having charged condenser 46 to a suitable value to accomplish this end. The charge current ($i$) of condenser 45 at any instant will be of a value $$i = \frac{E}{R} \epsilon^{\frac{-t}{RC}}$$

where

E is the +200 volts applied.
R is the value of resistor 41 which is very large compared to the value of resistors 40, 42, 43 and the resistance of the transformer winding.
C is the value of capacitor 45.
$t$ is the elapsed time after the application of the 200 volts.

Since a complete scanning cycle takes place in one-sixtieth of a second or .0167 second, it will be appreciated that, if the time constant RC is chosen very large compared to .0167 second, the value of the charging current approaches the value $$I = \frac{E}{R}$$

Figure 3A:
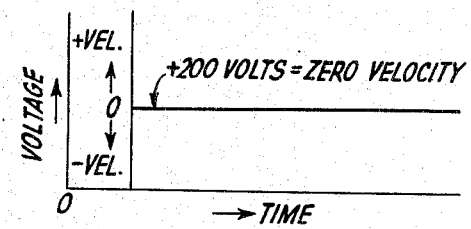
Figure 3B:
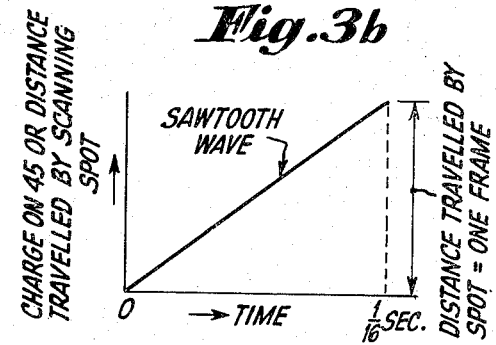

When this is the case, since the charge Q on condenser 45 is $$Q = \int_0^t i\,dt$$

the charge will build up as a straight line function as shown in Fig. 3b.

Figure 4A:
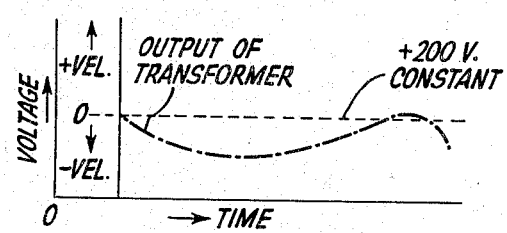
Figure 4B:
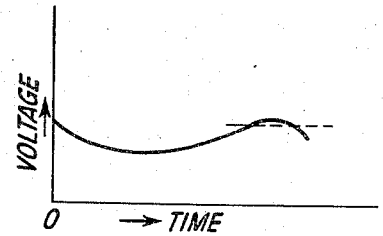
Figure 4C:
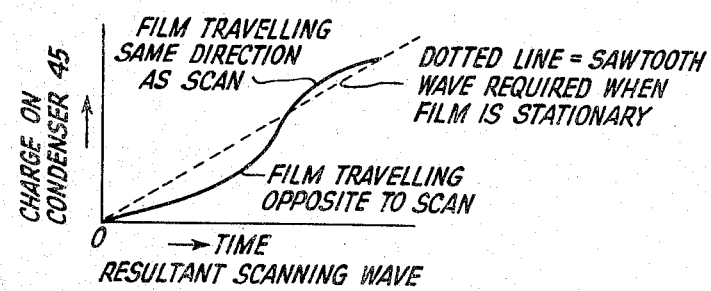

The value of a constant applied potential of 200 volts, for example, will have an effect in producing a scanning wave which corresponds to the condition where the film is at rest and scanning takes place in a linear fashion since during this time there is substantially no transfer of voltage between the primary and secondary of transformer 39. As soon as the film starts to move, there will be produced from the low pass filter 37 a voltage waveform proportional to the direction and velocity of the film and the effect of this voltage on the secondary of transformer 39 will be to add to or detract from the value of the 200 volts normally impressed on condenser 45. The relationship between the fixed 200 volts and the output of the transformer is shown in Fig. 4a and Fig. 4b shows the resultant voltage applied to the integrator when the film moves. The result will be that instead of a linear charge pattern for the condenser 45, the resultant scanning wave when the film moves will be that as shown in Fig. 4c. It will be seen that compensation can be made for the film slipping back against its normal direction of motion as well as compensation in the scanning for the motion of the film when it is in a direction opposite to the scanning.

Referring to Fig. 5, there is shown an alternative form of the invention. In the arrangement of this figure also, a so-called "flying spot" of light is developed by a cathode ray tube which is identified in the drawings as the scansion tube. The spot of light is moved by changing the point of impingement of the cathode ray beam developed within the tube onto a fluorescent or luminescent target. Since the film is moved in a vertical direction relatively to the scanning tube, and further, since the film itself is to be scanned during its pull down time, it is to the vertical deflecting coil that a waveform will have to be supplied that will move the scanning spot vertically at an appropriate speed to accomplish scanning. The movement of the film normally will be downward and the moving of the scanning spot vertically will be opposite in direction. This has been so indicated by the arrows on the drawing which are positioned adjacent the film. Horizontal movement of the scanning spot takes place at a predetermined fixed rate and potentials for this purpose may be derived by well known means as, for instance, oscillation generators of the general type shown in U. S. Patent Re. No. 20,338 to William A. Tolson and granted April 20, 1937.

There is provided a second cathode ray tube 12 in which the beam is not moved horizontally but is moved vertically only. The tube is illustrated as utilizing electrostatic deflection and the spot formed by the impingement of the beam on the target of the tube is moved by a sawtoothed waveform as in the arrangement of Fig. 1.

The light spot formed and moved by the second tube is directed toward the section of the film containing the sprocket holes. Interposed between the film and the cathode ray tube 12 is a mask 14 which limits the area scanned to that on the margin of the film containing the sprocket holes. In practice, this would be the length of several sprocket holes on the film and, for purposes of illustration, this may be assumed to be four holes. On the side of the film opposite to that on which the tube 12 is located is a lens system 17 which picks up the light from the spot formed by tube 12 and directs it onto the cathode of a photo-electric tube 18. Since the spot traverses the tube vertically at a rate of 6 kc. and since it will be "chopped" by four holes of the film, the output frequency of photoelectric tube 4 will be a 24 kc. note. When the film moves, there will be formed a series of pulses which are spaced apart by a distance bearing a relationship to the speed and direction of the film motion and which, therefore, may be said to be "time modulated."

The pulses from tube 18 are passed through a wide band amplifier and clipper 19 which may be of well known form. This unit may consist, for example, of one or more amplifier stages followed by amplitude limiting diodes so that both sides of the wave are clipped off. The original wave should be clipped "100-to-1," that is, amplified and clipped so that the portion of the wave appearing at the output represents a one per cent slice from the center of the original wave. Thus, pulses of substantially constant amplitude will be produced even if the film opacity around the sprocket holes should vary within wide limits.

The output pulses from the unit 19 which are of substantially equal amplitudes but of variable spacing in time if the film is accelerating or decelerating, are impressed onto a multi-stroke type of multivibrator or, as it is known in the art, a "flip-flop" type of multivibrator 22. The output of multivibrator 22 is impressed onto an amplifying and clipping circuit 24 and thence to a demodulator in the form of a low pass filter. Such filters are well known and may be constructed in accordance with the teachings of the publication by Shea hereinbefore referred to in this specification.

There is provided a stabilized oscillator 25 whose output frequency is 24 kc. and the output wave therefrom is passed through a clipper-amplifier 26 and thence to a pulse delay circuit 23. The latter may be of the general type of an "artificial line" consisting of a ladder network of series coils and shunt capacitors. The cutoff frequency of the artificial line should be substantially greater than 24 kc. to avoid transient effects. It should be designed for a cutoff frequency of about 240 kc. and may have a characteristic impedance of the order of 1000 ohms. The 24 kc. pulses from the output of circuit 23, which are of the same frequency as the output pulses of photoelectric tube 18, are impressed onto multivibrator 22.

The 24 kc. fixed frequency, equally spaced, substantially rectangularly shaped pulses from clipper-amplifier 26 are impressed onto a frequency divider 27 whose output frequency is one-fourth that of the input thereto. This may be, for instance, one of the well known pulse "counter" circuits or a multivibrator firing on every fourth pulse delivered to it by clipper-amplifier 26. The 6 kc. wave so formed may be passed through a clipper-amplifier circuit 28 and these pulses may be used to trigger the discharge tube of a sawtoothed wave generator 29. This circuit will be the same as that illustrated in Fig. 1 and identified by reference numerals 29 through 36. The 6 kc. sawtooth wave so formed, and which bears a definite time relationship with respect to the 24 kc. wave output of circuit 23, may be passed through amplifier 16 and used to control the deflection of the beam formed in tube 12.

The output of demodulator 37 is impressed, through an appropriate coupling means, onto one of the control grids of a multigrid tube 60. Onto another of the control grids of this tube is impressed the output wave from a 50 kc. oscillator 61 through appropriate coupling means. Tube 60 will act as a gate to control the passage of pulses therethrough of pulses from oscillator 61.

The output pulses from tube 60 are impressed onto a double diode 62, one diode element of which has the output arranged to charge integrating condenser 63. This condenser is shunted across the space charge path of tube 64 and the latter is triggered by 60 cycle rectangular pulses.

The potential of the control grid of a vacuum tube 65 follows the potential on integrating condenser 63 and, accordingly, the output voltage of this tube will follow the changes in the voltage to which this condenser is charged. The output of tube 65 is combined with the output of vacuum tube 66, the latter comprising an amplifier having supplied thereto through appropriate coupling means including diode 67, the 60 cycle sawtoothed wave supplied by the triggered sawtooth oscillator including tube 68. The action of the device is as follows:

When the film is stationary, the pulse output of phototube 18 will be constant, i. e., the pulses will be equally spaced apart. Under these circumstances, the output wave from the low pass filter will be a voltage of a definite value and it can be arranged that this voltage be less than the voltage necessary to be applied to the grid of tube 60 to make the tube conduct. In other words, when this situation prevails, the signals from the oscillator 61 will not pass through tube 60. On the other hand, when the film is moving, the pulses from phototube 18 will be time modulated and the output of the demodulator will be a voltage which is larger than the value needed to gate the tube 60 (see Fig. 2f) and the signals from the oscillator 61 will pass through tube 60 and be rectified by tube 62 and thus furnish a charge to condenser 63. This charge is erased by the positive portions of the 60 cycle pulse input to tube 64. The grid of tube 65 will be biased in accordance with the value of the charge on condenser 63 and the plate current of this tube will follow the pattern of the charging of condenser 63. This waveform then is combined with the output wave from tube 66 which normally is a saw-tooth waveform. The two combined waves then are fed to the vertical deflection amplifier 70 which furnishes current to the vertical deflection coils of tube 1 and thus a deflection of the beam in tube 1 and hence the position of the flying light spot is determined by the speed of the film itself.

The systems set out hereinbefore have a number of advantages. In the first place, the high sweep frequency that is used in conjunction with the auxiliary cathode ray tube allows a very high degree of compensation to be made for the speed and motion of the film. Secondly, the systems allow the use of standard film even when the spaces about the sprocket holes are not entirely opaque. Thirdly, variable opaqueness of the areas around the sprocket holes should produce no trouble if the output pulses developed by the phototube 18 are clipped sufficiently by clipper 19. Fourthly, the systems should be independent of any exact form of film motion and the high sweep frequency used in conjunction with the sprocket holes should be high enough to compensate even for unsteady film motion.

Having thus described the invention, what is claimed and desired to be secured by Letters Patent is the following:

1. The method of scanning a recorded image which comprises the steps of developing an illuminated area, moving the developed illuminated area under the control of an electrical waveform at a predetermined rate, developing a compensatory electrical waveform whose wave shape bears a predetermined relationship to the speed at which the recording material is moved, and altering the waveform of the electrical wave for moving the illuminated area with the compensatory waveform when the recorded image is moved.

2. The method in accordance with claim 1 wherein the waveform for moving the illuminated area is a substantially saw-tooth shaped waveform.

3. In film scansion apparatus, means to develop a moving spot of light whose movement is under the control of an electrical deflection waveform, means to develop electrical pulses modulated in accordance with the speed of movement of the film undergoing scansion, a low pass signal communicatory circuit for developing a correcting voltage waveform under the control of said modulated pulses, and means to control the shape of the electrical waveform for moving the light spot in accordance with the correcting voltage waveform developed by said low pass signal communicatory means.

4. In film scansion apparatus, a first cathode ray tube having means for developing and directing a cathode ray beam toward a luminescent target to produce a spot of light, means for deflecting said beam, a second cathode ray tube having means for developing and directing a cathode ray beam toward a luminescent target to develop a spot of light, means for deflecting the beam developed in the second cathode ray tube, a photoelectric element positioned to respond to the light spot of said second cathode ray tube, means to deflect the cathode ray beam formed in the second cathode ray tube at a predetermined rate to move the spot of light developed within said tube such to cause a variation in the output wave of the photoelectric element when a moving film is interposed between the second cathode ray tube and the photoelectric element, means to shape the output wave of the photoelectric element, means to develop a compensatory waveform under the influence of the shaped photoelectric output wave, means to develop an electrical waveform to control the deflection of the cathode ray beam in the first cathode ray tube in a predetermined fashion, and means for affecting the waveform impressed onto the deflecting means in the first cathode ray tube under the influence of the compensatory waveform.

5. Apparatus in accordance with claim 4 wherein the means for shaping the output wave from the photoelectric element includes a multivibrator element having a control wave of predetermined frequency impressed thereon, means for impressing a representation of the output wave of the photoelectric element onto said multivibrator to further control its operating states, and means for amplifying and limiting the output wave from said multivibrator.

6. Apparatus in accordance with claim 5 wherein there is provided in addition electrical energy storage means, rectifying means connected to said storage means so as to store energy therein, an oscillator, and means for impressing the output frequency of said oscillator onto said rectifying means under the control of the output wave from said multivibrator after amplifying and limiting.

7. Apparatus in accordance with claim 6 wherein there is provided in addition a first thermionic tube, means for impressing onto the input circuit of said thermionic tube the waveform for normally controlling the deflection of the cathode ray beam in the first cathode ray tube, a second thermionic tube, means for controlling the bias on the input circuit of said second thermionic tube in accordance with the value of the energy stored in the electrical energy storage means, and means common to the output circuits of both of said thermionic tubes to combine the output waves occurring in each.

8. In film scansion apparatus for scanning optical images recorded on a motion picture film, a first cathode ray tube having means to develop and direct a cathode ray beam toward a luminescent target to produce a spot of light, means to deflect said beam so as to move the position of said spot of light, a first photoelectric means positioned so as to receive light which has been modulated in accordance with the portions of the image recorded on the motion picture film, a second cathode ray tube having means to develop and direct a cathode ray beam toward a luminescent target, a second photoelectric element positioned so as to receive light from the second cathode ray tube which has passed to a position whereby it has been influenced by the transparency and opacity of portions of the film, a first oscillating means, means to control the movement of the cathode ray beam in said second cathode ray tube under the influence of a waveform which is a harmonic of the output frequency of the first oscillating means, a multi-stroke multivibrator, means for controlling the operating state of said multivibrator under the control of the output frequency of the first oscillating means and the output wave from the second photoelectric element, means to demodulate the output waveform of the multivibrator, means for integrating the pulses derived from the demodulation of the output wave of the multivibrator, means for developing a compensatory waveform under the influence of said integrated waveform, a second oscillator, means for altering the output wave from the said second oscillator in accordance with the values of the compensatory wave form, and means for impressing said altered waveform onto the deflecting means of the first cathode ray tube to control the movement of the cathode ray beam in a manner which bears a definite relationship to the speed of movement of the film.

9. Apparatus in accordance with claim 8 wherein the means for integrating the pulses derived from the demodulation of the output wave of the multivibrator comprise a third oscillator, a multigrid thermionic tube, means for impressing the output waves from the demodulator onto one of the grids of said multigrid tube, means for impressing the output wave from the third oscillator onto another of the grids of the multigrid tube, rectifying means connected in the output circuit of said thermionic tube, and an electrical energy storage element connected to said rectifying means to receive and store energy rectified by said rectifying means.

10. Apparatus in accordance with claim 8 wherein the waveform which is a harmonic of the output frequency of the first oscillating means for controlling the movement of the cathode ray beam in said second cathode ray tube is developed by a frequency divider having a portion of the output of the first oscillating means impressed onto the input circuit thereto.

11. The method of scanning an image recorded on a film which is moved intermittently, which comprises the steps of developing an illuminated area of elemental size, directing the illuminated area onto the film, moving the developed illuminated area under the control of an electrical waveform of pre-determined configuration while the film is at rest, developing signals modulated in accordance with the varying values of opacity and transparency of the film during the movement of the illuminated area, developing a compensatory electrical waveform when the film is moved which maintains a relationship only to the speed at which the film is moved, and altering the waveform which controls the movement of the illuminated area when the film is at rest under the influence of the waveform developed while the film is in motion to compensate for the movement of the film and to allow scansion of the film during the intervals when the film is moved.

12. Method in accordance with claim 11 wherein the waveform which is developed when the film is moving is developed under the control of the film.

13. A film scansion apparatus for scanning images recorded on a film comprising electrical means to develop an illuminated area of elemental size, means to direct the illuminated area onto the film, means for developing an electrical waveform of pre-determined configuration, means to control the deflection of the illuminated area under the control of the waveform of pre-determined configuration while the film is at rest to scan the film in at least one coordinate of movement, photoelectric means positioned so as to be responsive to the deflected illuminated area after its impingement onto the film to develop signals representative of the light values of parts of the image recorded on the film, electrical means for developing a waveform representative of the speed with which the film is moved during the movement of the film, and means for altering the normal deflection of the illuminated area under the control of the waveform of pre-determined configuration by the waveform representative of the speed of movement of the film to compensate for the movement of the film during the scansion thereof while the film is moving.

14. Apparatus in accordance with claim 13 wherein the means for developing the compensatory waveform representative of the speed with which the film is being moved during the movement of the film includes means for developing a second illuminated area, photoelectric means responsive to said second illuminated area, and means for directing the second illuminated area onto the film whereby the output of the photoelectrical means responsive thereto is modulated in accordance with modulations of the illuminated area and by indicia contained by the film.

15. Apparatus in accordance with claim 3 wherein said deflection waveform is developed by a sawtooth condenser discharge generator circuit employing a capacitor connected for periodic charging from a source a B power supply and wherein said correcting voltage waveform is serially interposed between said sawtooth discharge generator circuit and said B power supply.

16. Apparatus according to claim 13 wherein said film scansion apparatus is of the motion picture variety and wherein said means for developing a waveform representative of the speed with which the film is moved during the movement of the film comprises a second electrical means to develop a second illuminated area of elemental size, means to direct the second illuminated area onto the film such to embrace a plurality of driving sprocket perforations, photoelectric means for developing electrical pulses in accordance with light passing through said sprocket perforations, and an electrical wave producing means responsive to the frequency of said pulses.

17. A photoelectronic means for determining instantaneous speed of motion picture film in passing through motion picture apparatus, said speed determining arrangement comprising a combination a deflectable beam of light directed on said film so as to illuminate at least a portion of a film sprocket perforation, means for deflecting said beam longitudinally along the film such that said beam embraces a plurality of film sprocket perforations, photoelectric means adjacent said film for responding to light from said deflected beam as modulated by said film perforations, a multivibrator circuit connected for control by the output of said photoelectric device as well as a stabilized control frequency and connections controlling the rate of light beam deflection in a harmonic of the stabilized control frequency for said multivibrator whereby the output of multivibrator comprises a plurality of width modulated pulses whose width modulation represents the speed of film travel.

FRANK J. SOMERS.

REFERENCES CITED

The following references are of record in the file of this patent:

UNITED STATES PATENTS

| Number | Name | Date |
|---|---|---|
| 2,011,737 | Thun | Aug. 20, 1935 |
| 2,037,577 | Harries | Apr. 14, 1936 |

FOREIGN PATENTS

| Number | Country | Date |
|---|---|---|
| 427,625 | Great Britain | Apr. 29, 1935 |

OTHER REFERENCES

Zworykin and Morton: "Television," John Wiley & Sons Inc., 1940, pages 238–241. Copy in Division 16.